United States Patent [19]
Arnold

[11] 3,845,548
[45] Nov. 5, 1974

[54] APPARATUS AND METHOD FOR INSERTING DYNAMOELECTRIC MACHINE COILS

[75] Inventor: Richard B. Arnold, Fort Wayne, Ind.

[73] Assignee: General Electric Company, Fort Wayne, Ind.

[22] Filed: Oct. 25, 1973

[21] Appl. No.: 409,575

[52] U.S. Cl.................... 29/596, 29/205 D, 29/606
[51] Int. Cl. ........................................... H02k 15/00
[58] Field of Search.......... 29/596, 605, 606, 205 R, 29/205 D, 205 E; 140/1

[56] References Cited
UNITED STATES PATENTS

| | | | |
|---|---|---|---|
| 3,447,225 | 6/1969 | Eminger............................ | 29/205 D |
| 3,559,268 | 2/1971 | Droll................................. | 29/205 D |
| 3,685,118 | 8/1972 | Payne et al. ....................... | 29/205 R |
| 3,686,735 | 8/1972 | Hill et al. .......................... | 29/205 R |
| 3,689,976 | 9/1972 | Donovan........................... | 29/205 D |

Primary Examiner—C. W. Lanham
Assistant Examiner—Carl E. Hall

[57] ABSTRACT

Method of inserting overlying coils into axially extending slots of a dynamoelectric machine core. Includes placing portions of turns of at least two coils (one of which overlies the other) in turn-receiving gaps of coil insertion equipment; moving turn advancing means comprising turn feeding or pushing members into engagement with selected portions of coils so as to move coils along gaps while nesting end turn portions of at least one coil in a pocket defined by turn advancing means, and while engaging end turn portions of at least some turns of each of coils directly with turn advancing means. At least, some winding turns are moved into core slots by applying coil inserting forces to end turn portions thereof rather than relying solely on the application of forces transmitted to side turn portions thereof. Apparatus includes coil advancing means having fins or blades movable along the winding turn accommodating gaps defined by upstanding blades. Fins axially move winding turns into axially extending slots of magnetic core. Coil advancing means includes contoured or multi-leveled surface regions that is configured to accommodate end turn portions of at least part of one coil in pocket regions. Coil advancing means also includes elevated portions that separate pocket regions and that engage directly end turn portions of at least some winding turns associated with an overlying coil.

11 Claims, 6 Drawing Figures

PATENTED NOV 5 1974

FIG. 5
FIG. 6
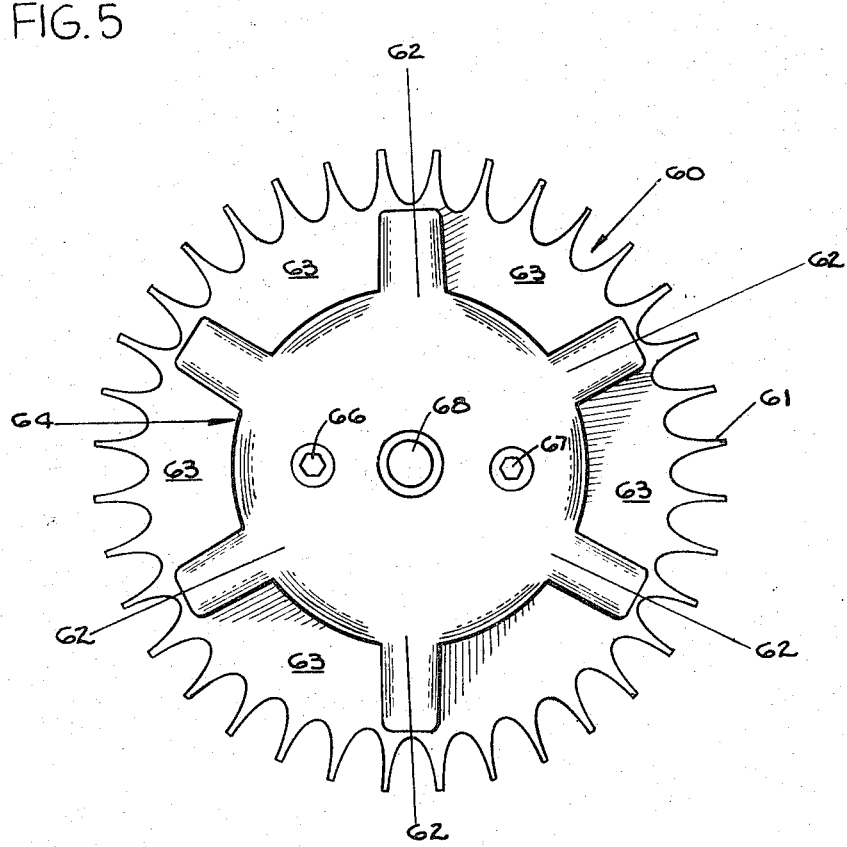
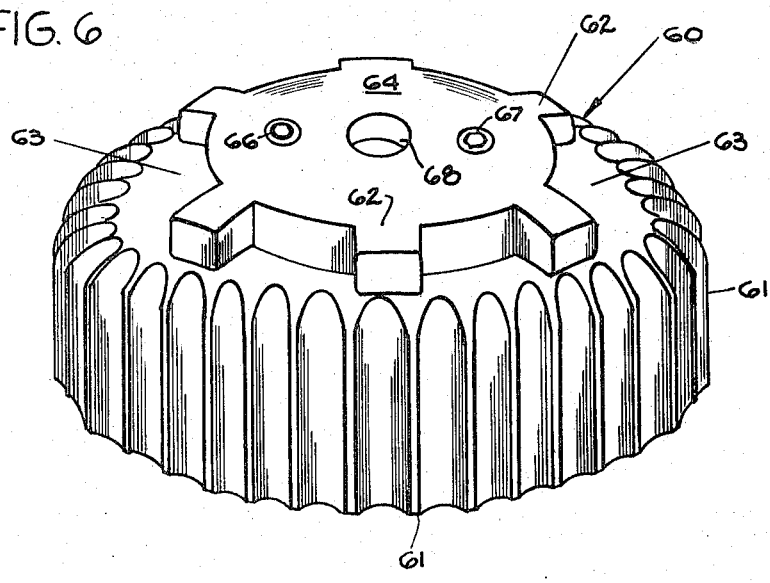

APPARATUS AND METHOD FOR INSERTING DYNAMOELECTRIC MACHINE COILS

BACKGROUND OF THE INVENTION

This invention relates generally to methods and apparatus for use in placing or inserting, at least, first and second winding coils, while at least a portion of the first coil overlies, at least, a portion of the second coil, into the axially extending slots of a magnetic core.

Methods and apparatus for use in axially inserting wound coils into magnetic cores of dynamoelectric machines have been known for some time. For example, apparatus generally useful for this purpose, is shown and described in Hill U.S. Pat. No. 3,324,536.

Other apparatus useful for this purpose is shown and described in various patents and patent applications that are assigned to the assignee of the present invention. Some of these are: Arnold et al. U.S. Pat. No. 3,643,317; Arnold U.S. Pat. No. 3,672,041; Smith U.S. Pat. No. 3,698,063; and co-pending application of Richard E. Lauer and Louis W. Pieper Ser. No. 276,789, which was filed on July 31, 1972 as a continuation-in-part of application Ser. No. 126,077 (which in turn was originally filed on Mar. 19, 1971).

In the apparatus illustrated in the patents and patent application referenced hereinabove; a plurality of gap defining blade or finger elements are utilized to maintain the separation of wound coils which, after placement in magnetic cores, form at least part of the energization windings of a dynamoelectric machine. Moreover, such apparatus utilizes pusher blades or fingers that push or strip winding turns along the gaps between adjacent gap defining members and into the slots of dynamoelectric machine cores.

While the apparatus known heretofore, has long been used to inject or insert separated and non-overlapping winding coils into a core with a high degree of efficiency, and with relatively high resultant percentages of slot fill (i.e., with a resultant relatively high density of conductor and insulating material in the magnetic core slots); I have found that it is substantially more difficult to consistently attain substantially the same relatively high resultant percentage of slot fill when two or more wound coils (one of which overlays another) are to be substantially simultaneously placed in the slots of a magnetic core.

In order to better explain what is meant by coils in "overlaying" relationship it is first noted that many induction motors utilize distributively arranged windings wherein each pole (for a given phase winding) comprises a coil group of one or more coils, each such coil having one or more winding turns. When a concentric winding approach is used, the different coils within a given coil group for a first or main phase winding are concentric with one another, and two adjacent coil groups are usually placed in the slots of a magnetic core in spaced apart relationship relative to one another.

However, when a second phase winding (e.g., a "start winding" in a resistance split-phase or capacitor start single phase motor, or the auxiliary winding in a capacitor run single phase motor) is also in place on such core, one or more coils of such second phase winding usually are arranged in overlapping relationship, with the side turn secion of one side of a given coil of one phase disposed in a first reference core slot, and with the first and second side turn sections (of the first and second sides, respectively) of a given coil of the other phase disposed in two mutually spaced apart slots that respectively are located in opposite directions (i.e., on opposite sides) from the reference core slot. When coils of the first and second phase are arranged as just described, they are in "overlapping" relationship and, of course, one will overlie the other. On the other hand, the side turn portions of two different coils of different coil groups (whether of the same or different phases) may be arranged on a core so as to share a common slot. In this case, the side turn portion of one coil will be in overlying relationship to the side turn portions of the other coil even if the two coils do not "overlap" one another. It should of course be understood that "overlapping" and "overlying" coils may also be found in three-phase motors or in generators, and that the above reference to single phase motors has been made only for descriptive purposes. Moreover, the terms "overlapping" and "overlying" are used consistently herein and are meant to have the meaning that may be implied from the above discussion. As a final note, it also is pointed out that if a portion of a first coil "overlies" a portion of a "second" coil while both are retained in the gaps of injection or insertion equipment of the type disclosed herein; a portion of the second coil will subsequently overlie a portion of the first coil after the coils are inserted into the slots of a magnetic core.

Heretofore, windings have been injected or inserted into core slots, one phase at a time. When this has been done, it has been possible to attain slot fills in shared slots, after subsequent placement of a second phase winding, on the order of sixty percent or more. As used herein, percent slot fill is meant to indicate the ratio (for a given slot) of the total cross-sectional area of: wire conductor, plus wire enamel or insulation, plus slot or ground insulation, plus slot wedge; to the total nominal cross-sectional area of the particular slot being considered. In this measurement, the total slot area is taken to be the gross area of a slot in a lamination, although the actual net useful area in a laminated core slot will be somewhat less due to lamination stagger or misalignment, burrs on the laminations, and so forth.

When I have attempted to simultaneously inject multiple coils, at least, two of which are in overlapping relation to one another, to attain previously attained levels of slot fill, I have found that damaged wire insulation results. In some cases, one or more turns of wire have actually broken.

Accordingly, it now has been noted that methods and apparatus known heretofore has certain shortcomings in being able to consistently attain a desired high degree of slot fill without causing undesirable damage to windings while attempting to insert two or more overlying winding coils, substantially simultaneously into core slots.

It would, therefore, be desirable to provide new and improved apparatus and methods whereby two or more overlying coils may be substantially simultaneously inserted into one or more slots of a magnetic core, without unduly damaging the winding material (including insulation), and yet while attaining satisfactory levels of slot fill. It also would be desirable to provide methods and apparatus whereby overlapping coils of one or more winding phases may be substantially simultaneously inserted or injected into the axially extending slots of a magnetic core with consistent high degrees of slot fill.

Accordingly, it is a general object of the present invention to provide improved methods and apparatus for placing overlying portions of winding coils into magnetic core slots.

It is yet another object of the present invention to provide improved means and methods for consistently placing winding coils that have overlapping portions into the axially extending slots of dynamoelectric machine cores with a high percentage of slot fill so as to provide satisfactory space utilization and yet not unduly damage the winding turns (including insulation thereon).

It is still another object of the present invention to provide new and improved methods and apparatus for placing winding coils of two or more winding phases into the axially extending slots of dynamoelectric machine magnetic cores.

SUMMARY OF THE INVENTION

In carrying out the above and other objects of the invention, in one form thereof, I provide a method of inserting overlying coils into axially extending slots of a dynamoelectric machine core. In one preferred form, the method includes the steps of placing portions of the turns of at least two coils (one of which overlies the other) in turn-receiving gaps of coil insertion equipment; moving turn advancing means comprising turn feeding or pushing members into engagement with selected portions of the coils so as to move the coils along the gaps of the gap defining members while nesting the end turn portions of, at least, one coil in a pocket defined by the turn or coil advancing means, and while engaging end turn portions of at least some of the turns of each of the coils directly with such turn advancing means. In this fashion, I move, at least, some winding turns into core slots by applying a coil inserting force to the end turn portions thereof rather than relying solely on the application of forces transmitted to side turn portions by turn feeding members. One illustrated form of apparatus that may be advantageously used to practice preferred forms of the invention includes coil advancing means in the form of a stripper having fins or blades movable along the winding turn accommodating gaps of the gap defining members which may be fingers or blades. These fins axially move winding turns into axially extending slots of a magnetic core that is supported in a desired aligned relationship with the gap defining members. The coil advancing means includes a contoured or multi-leveled surface region that is contoured or shaped to accommodate end turn portions of, at least, part of one coil in pocket regions formed thereon. The coil advancing means also includes elevated portions that separate pocket regions and that engage directly end turn portions of at least some winding turns associated with a coil that is in an overlying relationship with the winding turns accommodated in the pocket regions.

The subject matter which I regard as my invention is particularly pointed out and distinctly claimed in the concluding portion of the specification. The invention itself, however, taken with further objects and advantages thereof, may be best understood by reference to the following description taken in conjunction with the accompanying drawings.

BRIEF DESCRIPTION OF THE DRAWINGS

FIG. 5 is a plan view of another stripper that may be used to practice the present invention and embodying certain features thereof; and FIG. 6 is a prospective view of the stripper shown in FIG. 5.

DESCRIPTION OF THE PREFERRED EMBODIMENTS

Figure 1:
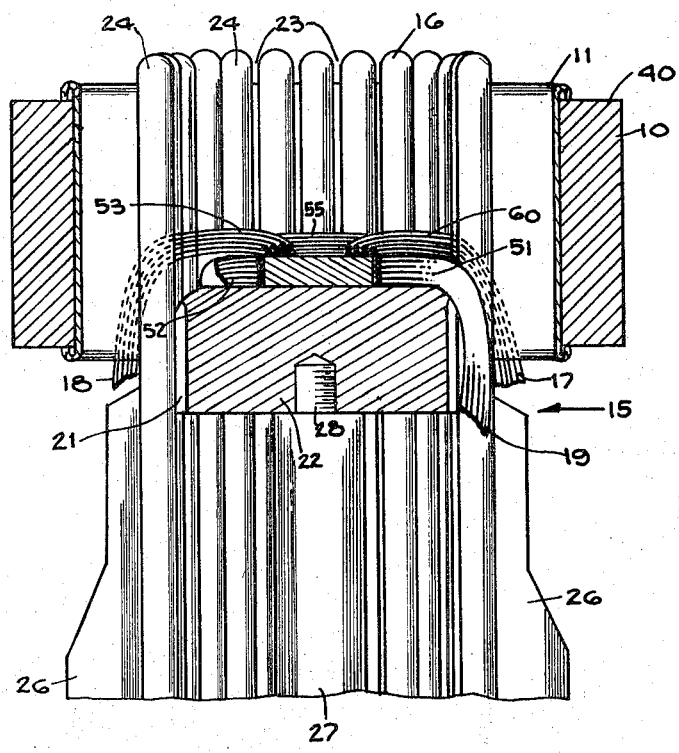
FIG. 1 is a cross-sectional elevation showing the relationships of a magnetic core, overlying and overlapping wound coils, a stator core, and apparatus embodying principles of the present invention, and useful in the practice of the present invention in one preferred form thereof.

Referring now to the drawings, and particularly to FIGS. 1–4, there has been illustrated therein, in a somewhat simplified and somewhat schematic form, various operating components of an apparatus for inserting coil side turn portions (and insulators when desired) into the axially extending slots of a magnetic core. For ease of illustration, various parts of a core 10 have been broken away, but core 10 is representative of a dynamoelectric machine magnetic core of the type, for example, used in electric motors. However, although not clearly revealed in FIG. 1, the core 10 may be laminated, i.e., formed of a stack of magnetic laminations which may or may not be secured together as will be understood by persons skilled in the art.

The laminations of core 10 may be relatively rigidly secured together by means of welding, keys, rivets, or any other suitable means. Alternatively, the core may be held together relatively loosely by the slot liners or ground insulation members illustrated at 11.

It should be understood that a description of the particular configuration and shape of the slots in the core 10 is not necessary for a full and complete understanding of the present invention, and the configuration of a particular core will depend (among other things) upon the end application of the motor, alternator, or generator in which such core is used. For example, the configuration of the core could be as shown in commonly assigned Hoffmeyer U.S. Pat. No. 3,633,056; as shown in commonly assigned Mason U.S. Pat. No. 3,702,498; or as shown in the now co-pending commonly assigned application that was filed in the name of Charles W. Otto on Sept. 24, 1973, as a continuation-in-part of patent application Ser. No. 246,315 (which was originally filed on Apr. 29, 1972).

The apparatus 15 includes gap defining members in the form of a plurality of spaced apart elongated divider blade 16. Accepted and accommodated in the gaps 23 between adjacent blades 16 are the side turn portions 17, 18, and 19 of winding coils that are to be inserted into the axially extending slots of the core 10 in which slot liners or insulators 11 are disposed.

Apparatus 15 further includes coil advancing means which are illustrated as including turn feeder blades 21 that are formed as integral extensions of a head 22. The turn feeder blades 21 are accommodated and positioned in the turn receiving gaps 23. As will be understood, when it is desired to utilize the apparatus 15 for insertion of insulating members, such as wedges, insulator or wedge guides 26 may be used to guide such members into core slots over winding portions positioned therein.

An actuator 27 is interconnected with the head 22, for example, by means of a stude 28 secured to the actuator rod 27 (or turned from said rod when said such rod is a solid member). The stud 28 may be threadedly received in the body portion 22 of the stripper as well as the rod 27. Alternatively, of course, the stud 28 could be brazed to the actuator 27. In an alternative arrangement, a centrally disposed opening may be provided in head 22, and a screw or bolt used to fasten the head 22 to the actuating rod 27. This approach is discussed in more detail hereinafter in conjunction with the description of the coil turn advancing means shown in FIGS. 5 and 6.

As will be best appreciated from a comparison of FIGS. 1-4, the head 22 is contoured to have elevated surfaces portions 31 that establish and define pocket regions 32.

Referring once again to FIGS. 1 and 2, the relation of overlapping coils and the coil advancing means will now be described. With reference first to FIG. 2, coil groups 30, 33, 34, and 35 are shown with the end turn portions thereof accommodated in pocket regions 32. The coil group 33 comprises coils 36 and 37, while coil group 34 comprises coils 38 and 39. For ease of illustration, only one coil for each of coil groups 30 and 35 have been shown; and the coils 36-39 have been represented by single turns of insulated wire. In actual practice, of course, each of such coils includes a plurality of turns.

It will be noted that side turn portions of, at least, one turn of each of the coils of coil groups 30 and 34-36 overlie a turn pusher blade 21 so that (refer to FIG. 1), when the coil advancing means moves axially toward top face 40 of core 10, through the bore of the core, pusher blades 21 will directly contact, at least, part of each of the coils of coil groups 30, 34-36. At the same time, the received surface of pocket regions 32, disposed within the bore of core 10, will engage directly at least some of the end turn portions of the coils of coil groups 30 and 34-36.

The coils 46, 47 also comprise a plurality of winding turns and collectively form still another coil group that overlies the coils of coil groups 33, 34. Other coil groups 45, 50 (and yet another not shown coil group) also are injected into core slots with the just described coil groups but, for ease of illustration, additional coils have been omitted from FIGS. 1 and 2. For completeness of disclosure, however, it is noted that the coil advancing means shown in FIGS. 1-4 is particularly adapted for use in injecting, substantially simultaneously, eight coil groups. The end turns of four of these groups would be accommodated in a pocket region 32, while the end turn portions of the other four coil groups would overlie the end turns so accommodated. The overlying end turns then are directly contacted by the elevated portions 31 of the coil advancing member.

Figure 2:
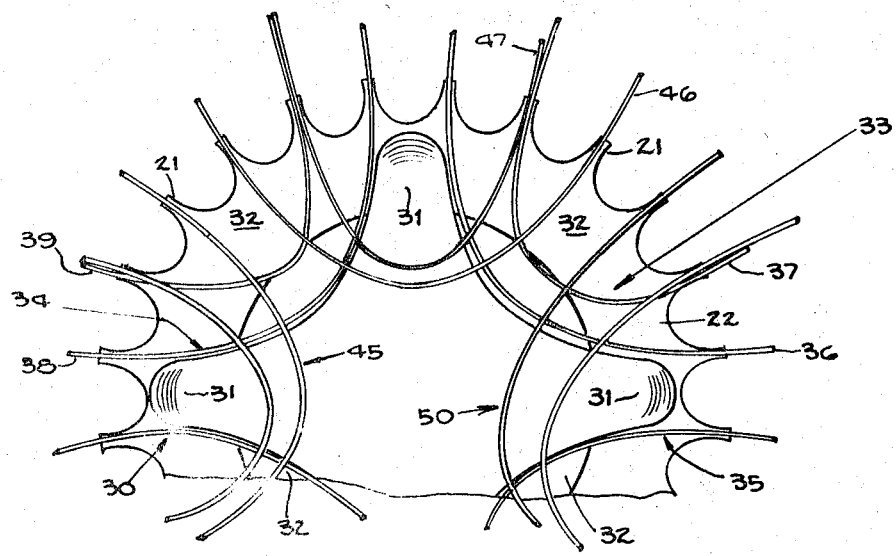
FIG. 2 is a plan view, with parts removed and parts broken away, of the structure shown in FIG. 1.

In FIG. 1, the relationships of two coil groups 51, 52, and three overlying coil groups 53, 55, and 60 have been shown. As the actuator 27 moves toward the upper face 40 of core 10, the side turn portions of coil groups 51, 52 are pushed directly by coil turn pusher or feeder blades 21 along gaps 23. At the same time, the end turn portions of coil groups 51 and 52 are pushed directly in an axial direction through the bore by upper surfaces of the coil advancing means which upper surfaces are the relieved pocket region establishing surfaces.

The side turn portions of coil groups 53, 55, and 60, however, are pushed axially along gaps 23 by wire to wire or turn to turn contact. I have found that if this contact alone is relied upon to insert coil groups such as coil groups 53, 55, and 60, objectionable wire insulation damage or wire breakage may occur. To avoid this result, I distribute the coil injection forces applied to an overlying or overlapping coil group (or coil groups) by also applying coil injection forces directly to the end turn portions of such coil group (or coil groups) by the coil advancing means.

In the illustrated embodiment, this is accomplished by engaging at least some of the end turn portions of an overlying coil with an elevated surface portion 31.

Turning now to FIGS. 5 and 6, coil turn advancing means in the form of stripper 60 has been shown. Stripper 60 includes coil turn feeder or pusher blades 61; elevated surface portions 62; and pocket establishing regions 63. The stripper 60 is particularly adapted for use while injecting twelve different coil groups, six of which would overlie (and overlap, if desired) respective ones of the remaining six coil groups. The stripper 60 was fabricated by fastening, e.g., with set screws 66, 67, a pocket establishing member 64 to the pusher blade establishing portion of the stripper. Alternatively, of course, the entire stripper 60 may be machined from a single piece of suitable material, such as, for example, brass. A centrally located counter-sunk bore or hole 68 may be used to fasten stripper 60 to an actuating member of a coil injection machine when desired.

Turning now once again to FIGS. 1-4, some of the benefits of practicing the present invention will be described, reference being had to an actual magnetic core and winding arrangement.

Figure 3:
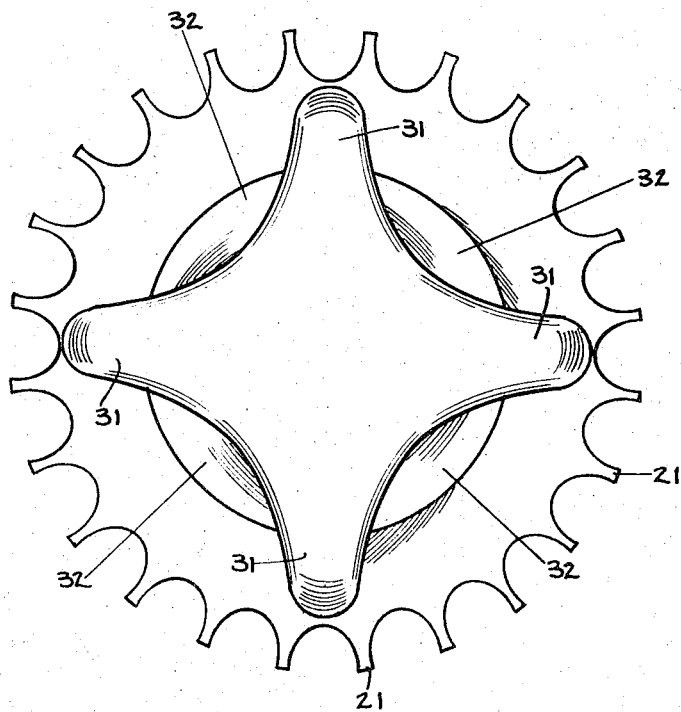
FIG. 3 is plan view of a stripper shown in FIGS. 1 and 2.
Figure 4:
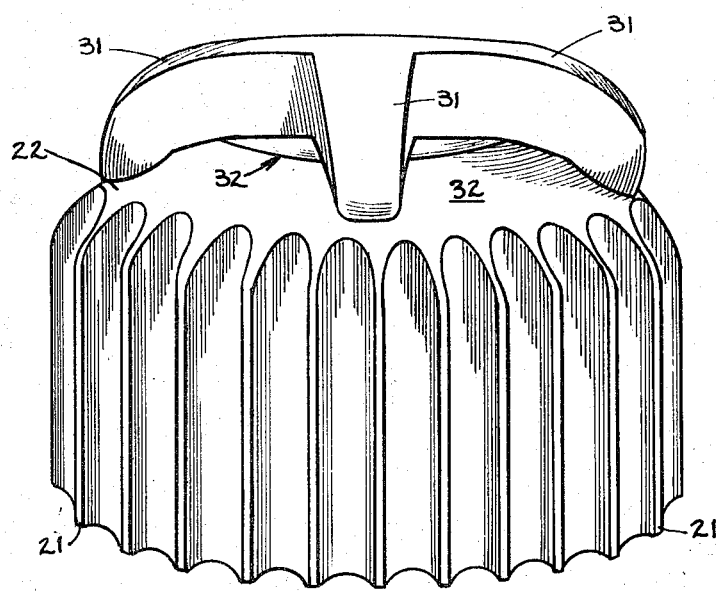
FIG. 4 is a side elevation of the stripper shown in FIG. 3.

In one trial, I injected eight coil groups (substantially simultaneously) into the axially extending slots of a stator core having 24 slots and the configuration of the core shown in FIG. 3 of the above referenced copending Otto application (the entire disclosure of which is incorporated herein by reference, as is all of the disclosure of each of the various patents and other application referred to hereinabove). The core had a nominal stack height of about 1 inch; a bore of about 2.77 inches; 24 axially extending slots; and and slot openings of the laminations making up the core were about 0.095 to about 0.100 of an inch. Of course, the actual net effective slot entrances or openings probably were somewhat less than the actual designed opening of the lamination slots. A discussion of the reasons for this is presented, for example, in Bair U.S. Pat. No. 3,762,041 which issued on Oct. 2, 1973, and which is assigned to the assignee of the present invention.

Of the eight coil groups injected, four coil groups were main windings comprised of 0.0359 of an inch (bare conductor dimension) insulated E. C. aluminum wire. The other four coil groups were comprised of 0.0213 of an inch (bare conductor dimension) insulated E. C. aluminum wire. The larger wire coils will hereafter be referred to as "main" windings or coils;

and the coils of smaller wire will be hereafter referred to as "auxiliary" windings or coils.

The main and auxiliary coil groups each comprised two concentric coils. The outer coils of the main coil groups were formed of about 74 turns of wire while the inner coils of the main coil groups were formed of about 54 turns of wire. The outer coils of each auxiliary coil group comprised about 39 turns of wire, and the inner (or smaller) coils of the auxiliary coil groups comprised about 29 turns of wire.

The larger coils of each of the coil groups spanned five core teeth, and the smaller coils of each coil group spanned three core teeth, after being injected into the core slots. The slot liners (corresponding to each slot liner 11 in FIG. 1 herein) were formed of 7 ½ mil polyethylene terepthalate, one commercial grade of which is marketed under the name "MYLAR" by E. I. DuPont de Nemours and Co., Inc.

When inserted on the slotted core, the main coil groups established four main poles, and the auxiliary coils established four auxiliary poles — with adjacent main and auxiliary poles spaced apart ninety electrical degrees. The inner or smaller coil of each auxiliary coil shared a core slot with a smaller or inner coil of a main coil; and the coils were so placed in the "square" outline core (as shown in the Otto application) so that the auxiliary poles were centered on diagonal lines drawn across the corners of the core. In other words, the outer coils of each auxiliary coil group were each disposed in a relatively small slot of the core located generally centrally along a side of the core.

When attempts were made to inject (substantially simultaneously) both of the above described main and auxiliary coil groups into the described core using heretofore known processes and apparatus, severe winding damage resulted. For example, severe dents in the insulation were observed and, in some trials, winding turn conductors were even broken.

However, when methods embodying the present invention were practiced, all coils were injected in a satisfactory manner, without objectionable winding damage. In these successful trials, about 58 percent slot fill was attained in the "shared" slots; and about 62 percent slot fill was attained in the non-shared core slots which accommodated 74 turns of main winding conductors.

In the successful trials just referred to, I first placed the auxiliary winding coil groups in gaps between divider blades of coil injection equipment and nested the end turn portions in pocket receiving regions of coil advancing means similar to that shown in FIGS. 1–4. The auxiliary coil groups thus were placed in a fashion similar to that shown for coil groups 30 and 33–35 in FIG. 2.

Thereafter, I placed side turn portions of the main winding coils in turn receiving gaps of the apparatus and positioned end turn portions thereof against the elevated or "overlying turn pushing surfaces" of the coil advancing means. The magnetic core then was placed in desired position relative to the gap defining members, with predetermined core slot openings aligned with predetermined gaps; the core was held in place by core hold down means; and the coil advancing means was moved axially along the bore of the core to accomplish satisfactory insertion of all of the winding coils.

During the just described insertion step, coil turn feeder or pusher blades directly contacted at least some side turn portions of the underlying coils. However, at least some of the overlying coil side turn portions had injection forces applied thereto only indirectly from the feeder blades.

In the case of the end turn portions, at least some of the end turn portions of all of the coil groups were directly engaged by the coil advancing means. In the case of underlying coils, end turn portions thereof were advanced by underlying coil end turn portion advancing surfaces (in the pocket establishing regions); while overlying coil end turn portions were engaged by elevated surfaces (such as surfaces 31 shown in FIGS. 2–4 herein).

In view of the foregoing, it will be understood that I have provided new and improved methods and apparatus. Moreover, it will be appreciated that the invention may be utilized whenever it is desired to axially inject or insert, substantially at the same time, both overlying and underlying coil turns whether or not such turns are also in "overlapping" relationship. In addition, such overlying turns may be associated with the same or different winding phases, and may be particularly arranged for two, four, six, or an other suitable number of pole, dynamoelectric machine applications.

Thus, in accordance with the Patent Statutes, I have described what at present are considered to be preferred approaches to the practice of, and preferred embodiments of my invention; it will be obvious to those skilled in the art that numerous changes and modifications may be made therein without departing from the invention.

What I claim as new and desire to secure by Letters Patent of the United States is:

1. A method of inserting at least two winding coils, each comprising at least one winding turn, one of which overlies the other, into axially extending slots of a dynamoelectric machine core; said method including placing portions of at least one turn of at least one first coil in turn-receiving gaps of coil insertion equipment; placing portions of at least one turn of at least one other coil in gaps of the coil insertion equipment and in overlying relationship to at least part of at least one turn of the at least one first coil; moving turn advancing means comprising turn feeding members into engagement with selected portions of at least one turn of the at least one first coil so as to apply force directly thereto, while nesting the end turn portion of at least one turn of the at least one first coil in a pocket defined by the turn advancing means, and while engaging at least one end turn portion of the at least one first coil and of the at least one other coil directly with the turn advancing means, whereby coil inserting forces are applied directly to an end turn portion of at least one turn of the at least one first coil and to an end turn portion of at least one turn of the at least one other coil while the at least one first coil and at least one other coil are moved along gaps of the coil injection equipment.

2. The method of claim 1 wherein placing portions of at least one turn of the at least one first coil includes placing at least one end turn portion in a pocket establishing region of the turn advancing means.

3. The method of claim 1 further including the step of placing a slotted magnetic dynamoelectric machine core in aligned relationship with winding turn accommodating gaps of the coil insertion equipment, and thereafter relatively moving the turn advancing means and dynamoelectric machine core to effect placement of winding turns into axially extending slots of the dynamoelectric machine core.

4. The method of claim 1 wherein the at least one other coil is disposed in overlapping relationship to the at least one first coil while the at least one first coil and at least one other coil are disposed with portions thereof in gaps of the injection equipment.

5. The method of claim 1 wherein the at least one first coil has portions thereof placed in magnetic core slots to establish at least part of a first phase winding and wherein the at least one other coil has portions thereof placed in magnetic core slots to establish at least part of a second phase winding.

6. The method of claim 1 wherein the at least one first coil and the at least one other coil each have portions placed in magnetic core slots to establish at least part of the same winding phase.

7. A method of inserting side turn portions of first and second coils of a dynamoelectric machine winding formed of turns of conductor wire wherein at least one first coil has at least some portions thereof overlying at least some portions of a second coil, the method of inserting including moving side turn portions of the first and second coils into predetermined axially extending slots of a magnetic core having axially extending slot entrances, extending between two faces of the core, positioned in predetermined alignment with gap defining members of coil insertion apparatus; the method including: engaging portions of at least the second coil in the vicinity of the gap determined by the gap defining members, and moving the second coil axially along gaps of the gap defining members toward predetermined ones of the axially extending core slots; and engaging at least some end turn portions of both the first and second coils directly with turn advancing means and moving the coils into magnetic core slots by applying axially directed forces to end turn portions of at least some of the turns of each of the first and second coils with the turn advancing means, thereby to more uniformly distribute injection forces applied to the first and second coils.

8. A method of placing at least first and second coils, each comprising at least one turn of wire, of a dynamoelectric machine winding into axially extending slots of a dynamoelectric machine magnetic core, wherein the first and second coils have at least parts thereof arranged in overlying relation prior to being placed into the magnetic core slots; the method comprising: placing at least one turn of the first coil between turn-receiving gaps of coil placing apparatus and placing at least one turn of the second coil in turn-receiving gaps of the coil placing apparatus with at least part of the at least one turn of the second coil arranged in overlying relationship to at least part of the at least one turn of the first coil; positioning a magnetic core with axially extending slots thereof aligned with the turn-receiving gaps; pulling the side turn portions of the first and second coils along the turn-receiving gaps and moving them into the slots of the magnetic core by engaging, with coil advancing means, directly at least one end turn portion of both the first and second coil; by directly engaging, with coil advancing means, at least one side turn portion of the first coil; and by moving at least one side turn portion of the second coil by engaging it with a moving portion of an underlying side turn portion of the first coil; whereby a reduced amount of coil placing force needs to be applied to side turn portions of the overlying second coil by side turn portions of the first coil during the coil placing process.

9. Coil placing apparatus comprising a plurality of winding turn-receiving gap defining members; means for advancing winding turns accommodated between adjacent ones of said gap defining members; said means for advancing comprising pocket establishing portions that define a relieved region for accommodating the end turn portions of at least one coil, and further comprising at least one elevated surface portion for supporting end turn portions of winding turns that have at least a portion thereof arranged in overlying relation to at least a portion of some of the turns that have the end turn portions thereof accommodated in the relieved region of the means for advancing; and actuating means for moving the means for advancing axially relative to the gap defining members whereby the at least some of the coil turns that have portions thereof overlying portions of other coil turns are directly engaged in the vicinity of the end portions thereof by said elevated surface portion thereby to diminish the inter turn forces that otherwise would be applied to the overlying portions of overlying coil turns.

10. Coil turn inserting apparatus including coil turn advancing means including coil turn feeder blades movable along winding turn accommodating gaps established by gap defining divider blades, and a contoured portion configured to accommodate a first number of end turn portions of coils along a number of angularly spaced apart pocket regions; said contoured portion further being configured to provide a raised surface region between two adjacent pocket regions for accommodating and applying turn inserting forces to end turn portions of coil turns that have at least a portion thereof disposed in overlying relation to at least portions of at least some other winding turns.

11. The apparatus of claim 10 wherein said pocket regions are defined, at least in part, by relieved surfaces; and wherein said raised surface region comprises at least one surface region spaced axially from said relieved surfaces.

* * * * *